US012244884B2

(12) United States Patent
May, Jr. et al.

(10) Patent No.: US 12,244,884 B2
(45) Date of Patent: *Mar. 4, 2025

(54) PACKAGER FOR SEGMENTER FLUIDITY

(71) Applicant: Disney Enterprises, Inc., Burbank, CA (US)

(72) Inventors: William B. May, Jr., Sunnyvale, CA (US); Eric R. Klein, Astoria, NY (US); William J. Zurat, South Orange, NJ (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/532,972

(22) Filed: Dec. 7, 2023

(65) Prior Publication Data
US 2024/0107097 A1 Mar. 28, 2024

Related U.S. Application Data

(63) Continuation of application No. 18/056,795, filed on Nov. 18, 2022, now Pat. No. 11,877,022, which is a
(Continued)

(51) Int. Cl.
H04N 21/262 (2011.01)
H04N 21/2343 (2011.01)
(Continued)

(52) U.S. Cl.
CPC . *H04N 21/26258* (2013.01); *H04N 21/23439* (2013.01); *H04N 21/2393* (2013.01); *H04N 21/8455* (2013.01)

(58) Field of Classification Search
None
See application file for complete search history.

(56) References Cited

U.S. PATENT DOCUMENTS 7,565,681 B2   7/2009   Ngo et al.
8,301,725 B2  10/2012   Biderman et al.
(Continued)

FOREIGN PATENT DOCUMENTS

CN   102308547 A   1/2012
CN   107683600 A   2/2018
(Continued)

OTHER PUBLICATIONS

European Patent Office Extended Search Report for Application No. 20195678.6-1209 dated Oct. 22, 2020.
(Continued)

*Primary Examiner* — An Son P Huynh
(74) *Attorney, Agent, or Firm* — Patterson + Sheridan, LLP

(57) ABSTRACT

Embodiments provide for methods, computer program products, and systems to improve media playback comprising receiving a variant stream, identifying respective maximum segment durations for a plurality of different types of client devices that will play media content contained in the variant stream, generating, using the variant stream, a respective playlist for each of the plurality of different types of client devices, wherein the respective playlists each contain different maximum segment durations, and delivering the respective playlists to at least one of the plurality of different types of client devices via a distribution network.

20 Claims, 7 Drawing Sheets

Related U.S. Application Data continuation of application No. 16/569,835, filed on Sep. 13, 2019, now Pat. No. 11,509,949.

(51) Int. Cl.
*H04N 21/239* (2011.01)
*H04N 21/845* (2011.01)

(56) References Cited

U.S. PATENT DOCUMENTS

| | | |
|---|---|---|
| 8,972,262 B1 | 3/2015 | Buryak |
| 9,538,232 B2 | 1/2017 | Carney et al. |
| 9,705,935 B2 | 7/2017 | Sundarraman et al. |
| 9,794,604 B2 | 10/2017 | Ohno et al. |
| 10,148,716 B1 | 12/2018 | Joseph et al. |
| 10,225,603 B2 | 3/2019 | Ramachandra |
| 10,484,446 B1 | 11/2019 | Waggoner et al. |
| 10,638,179 B2 | 4/2020 | Hosur |
| 10,701,415 B2 | 6/2020 | Lee et al. |
| 11,509,949 B2 | 11/2022 | May, Jr. et al. |
| 2002/0061653 A1 | 5/2002 | Pinter et al. |
| 2002/0157112 A1 | 10/2002 | Kuhn |
| 2007/0154169 A1 | 7/2007 | Cordray et al. |
| 2007/0272667 A1 | 11/2007 | Lei et al. |
| 2008/0127272 A1 | 5/2008 | Cragun et al. |
| 2010/0251295 A1 | 9/2010 | Amento et al. |
| 2011/0246621 A1 | 10/2011 | May, Jr. et al. |
| 2011/0252118 A1 | 10/2011 | Pantos et al. |
| 2011/0268178 A1 | 11/2011 | Park et al. |
| 2012/0047542 A1 | 2/2012 | Lewis et al. |
| 2012/0151009 A1 | 6/2012 | Bouazizi et al. |
| 2012/0254456 A1 | 10/2012 | Visharam et al. |
| 2012/0311094 A1 | 12/2012 | Biderman et al. |
| 2012/0314761 A1 | 12/2012 | Melnyk et al. |
| 2013/0007223 A1 | 1/2013 | Luby et al. |
| 2013/0064283 A1 | 3/2013 | Sun et al. |
| 2013/0254041 A1 | 9/2013 | Sherwin et al. |
| 2014/0143440 A1 | 5/2014 | Ramamurthy et al. |
| 2014/0189772 A1 | 7/2014 | Yamagishi et al. |
| 2014/0258366 A1 | 9/2014 | L'Heureux et al. |
| 2014/0282787 A1 | 9/2014 | Wirick et al. |
| 2014/0351385 A1 | 11/2014 | Li et al. |
| 2015/0089557 A1 | 3/2015 | Busse |
| 2015/0172340 A1 | 6/2015 | Lohmar et al. |
| 2015/0249869 A1 | 9/2015 | Dhruv et al. |
| 2015/0256600 A1 | 9/2015 | Dakhane et al. |
| 2015/0256906 A1 | 9/2015 | Jones |
| 2015/0327025 A1 | 11/2015 | Yamagishi |
| 2016/0014439 A1 | 1/2016 | Friedrich et al. |
| 2016/0044388 A1 | 2/2016 | Guionnet et al. |
| 2016/0094875 A1 | 3/2016 | Peterson et al. |
| 2016/0127440 A1 | 5/2016 | Gordon |
| 2016/0269459 A1 | 9/2016 | Harden et al. |
| 2016/0294898 A1 | 10/2016 | Wheelock |
| 2016/0316280 A1 | 10/2016 | Bulley et al. |
| 2016/0366198 A1 | 12/2016 | Jennings et al. |
| 2017/0085933 A1 | 3/2017 | Czeck, Jr. et al. |
| 2017/0094338 A1 | 3/2017 | Kamekura et al. |
| 2017/0289639 A1 | 10/2017 | Reisner |
| 2017/0302981 A1 | 10/2017 | Sethuraman et al. |
| 2017/0339437 A1 | 11/2017 | Lee et al. |
| 2018/0035140 A1 | 2/2018 | Li et al. |
| 2018/0035176 A1 | 2/2018 | Stockhammer |
| 2018/0097772 A1 | 4/2018 | Tirpak |
| 2018/0198871 A1 | 7/2018 | Walker et al. |
| 2018/0206136 A1 | 7/2018 | Chow et al. |
| 2018/0213063 A1 | 7/2018 | Vajravel |
| 2019/0028743 A1 | 1/2019 | He et al. |
| 2019/0068673 A1 | 2/2019 | Giladi et al. |
| 2019/0069039 A1 | 2/2019 | Phillips |
| 2019/0166412 A1 | 5/2019 | Panchaksharaiah et al. |
| 2019/0364330 A1 | 11/2019 | Moroney et al. |
| 2020/0344510 A1 | 10/2020 | McMurray et al. |

FOREIGN PATENT DOCUMENTS

| | | |
|---|---|---|
| JP | 2010232661 A | 10/2010 |
| JP | 2012503844 A | 2/2012 |
| KR | 1020150014462 B1 | 2/2015 |
| KR | 1020170085981 B1 | 7/2017 |
| WO | 2011159140 A2 | 12/2011 |
| WO | 2015100392 A2 | 7/2015 |

OTHER PUBLICATIONS

OpenCable (TM) Specificiations Adaptive Transport Stream Specification, Feb. 14, 2014, X55188214.

Pantos R. et al.: "HTTP Live Streaming; draft-pantos-http-live-streaming-18.txt", Internet Engineering Task Force, Standardworkingdraft, Internet Society (ISOC) 4, Rue Des Falaises CH-1205, Geneva Switzerland, Nov. 19, 2015, pp. 1-49.

Intellectual Property India, Examination Report under sections 12 & 13 of the Patents Act 1970 and the Patent Rules, 2003 for Application 202044039563 dated Dec. 3, 2021.

Notice of Preliminary Rejection for Korean Patent Application No. 10-2020-0117707 dated Jan. 28, 2022.

National Intellectual Property Administration, PRC for Chinese Application 202010962693.8 dated May 12, 2022.

Korean Intellectual Property Office, Notice of Last Preliminary Rejection for Korean Patent Application No. 10-2020-0117707 dated Jul. 15, 2022.

European Patent Office, Communication Pursuant to Article 94(3) EPC for European Patent Application No. 20195678.6, dated Apr. 2, 2024.

PACKAGER FOR SEGMENTER FLUIDITY

CROSS-REFERENCE TO RELATED APPLICATIONS

This application is a continuation of co-pending U.S. patent application Ser. No. 18/056,795, filed Nov. 18, 2022, which is a continuation of U.S. Pat. No. 11,509,949 issued on Nov. 22, 2022, which are herein incorporated by reference in their entirety.

BACKGROUND

Adaptive bitrate streaming (ABR) is a computer network streaming technique that can provide continuous, uninterrupted media playback to a client device. ABR involves measuring the network bandwidth and data throughput of the client device in real time, and adjusting the streaming quality delivered to the client device accordingly.

The streaming quality is indicative of the size of the file containing the media content. A high quality stream indicates a high streaming bitrate, and thus a relatively large file size. Hence, the high quality stream requires more network bandwidth and greater data throughput of the client device to ensure continuous, uninterrupted media playback on the client device. Similarly, a low quality stream indicates a small streaming bitrate, and thus a relatively small file size. Hence, the low quality stream requires less network bandwidth and less data throughput of the client device to ensure continuous, uninterrupted media playback on the client device.

BRIEF DESCRIPTION OF THE DRAWINGS

So that the manner in which the above recited aspects are attained and can be understood in detail, a more particular description of embodiments described herein, briefly summarized above, may be had by reference to the appended drawings. It is to be noted, however, that the appended drawings illustrate typical embodiments and are therefore not to be considered limiting; other equally effective embodiments are contemplated.

DETAILED DESCRIPTION

Figure 1:
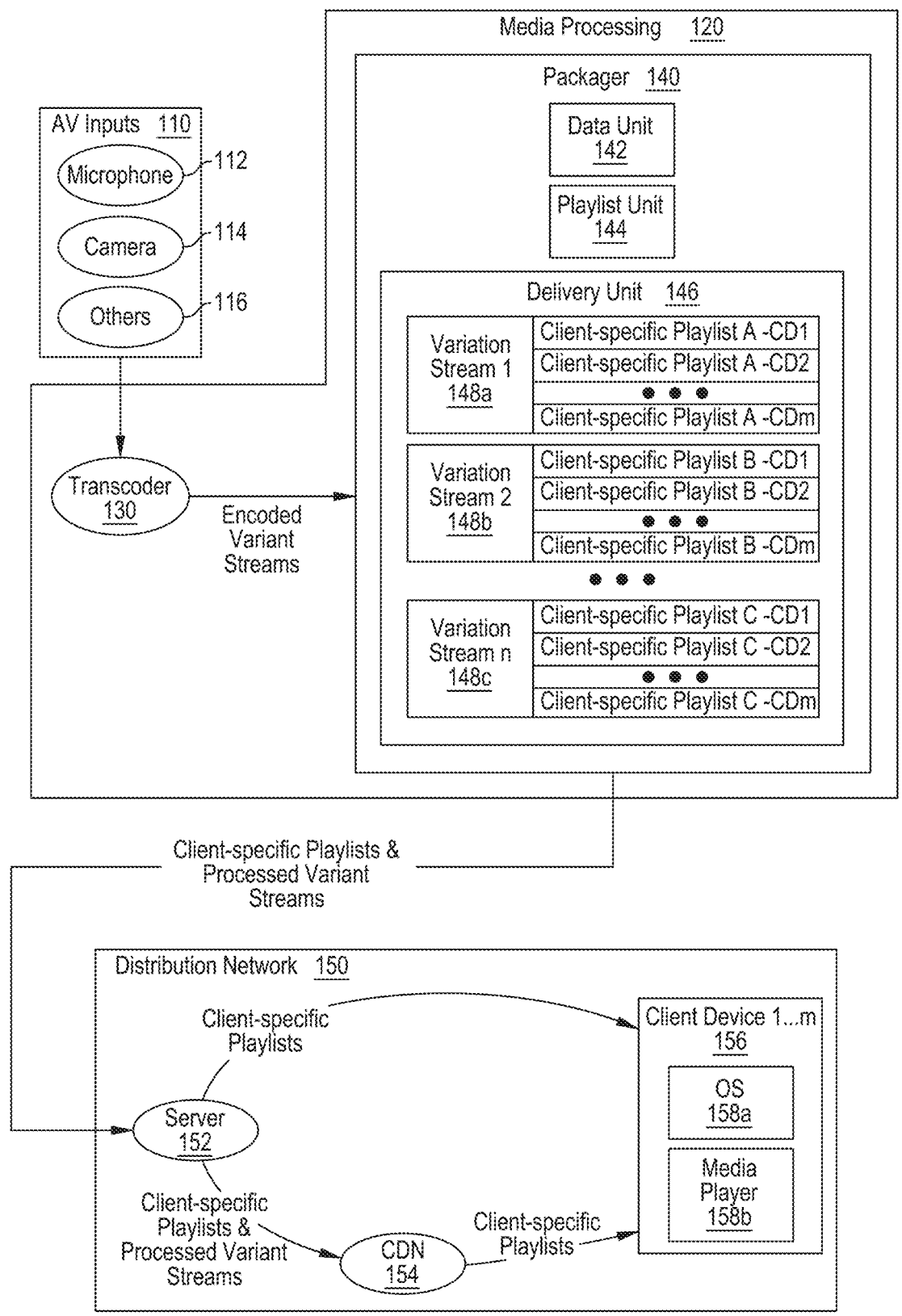
FIG. 1 illustrates a system for delivering client-specific playlists and processed variant streams to client devices, according to one embodiment.

So that features of the present disclosure can be understood in detail, embodiments of the present invention disclosed herein may reference HTTP Live Streaming (HLS) as the computer network streaming protocol. The client device platform or operating system (OS) may be referenced as OS A, OS B, OS C, and so on. Examples of an OS include Android™ and iOS™. A client device media player may be referenced as Media Player A, Media Player B, Media Player C, and so on. One example of a client device media player is a JavaScript-based media player. However, the disclosed embodiments should not be interpreted as being confined to any of the aforementioned network protocols, platforms or OSs, or media players.

HLS is a computer network streaming protocol that can deliver media content via a master playlist. The master playlist references multiple variant streams, each of which represents a different streaming quality for the same media content. Each variant stream includes a media playlist that references a collection of sequential, maximum-duration segments of media content to be played in order by a client device.

Segments are identified in the media playlist by one or more Uniform Resource Identifiers (URIs) and, optionally, a byte-range. A URI is a string of characters that identifies a resource on the Internet. Each segment in the media playlist begins and ends at a segment boundary that is typically synchronized across the multiple variant streams. ABR is implemented by adjusting the streaming quality at these aligned segment boundaries. These adjustments involve switching from a grouping of segments in one variant stream to a sequential grouping of segments in a different variant stream.

Optimizing media playback for HLS may be hindered by differences in client devices or client media players. Upon beginning media playback, many client devices download a fixed number of segments, irrespective of the segments' duration. Other client devices buffer for a fixed amount of time, irrespective of the number of segments downloaded. Hence, different client devices (e.g., clients with different types of OS or media players) may have different or opposing performance optimizations for media playback.

Further, many media players begin media playback at a medium streaming quality, rather than a high streaming quality, to minimize skips in the media playback due to buffering caused by the inability to sustain an initial high streaming quality. One disadvantage of beginning media playback at a medium streaming quality occurs when a higher streaming quality is supported by the available bandwidth and data throughput of the client device. Performance of the media playback is not optimized in such a case since time is spent at the medium streaming quality while the client is downloading a fixed number of segments or downloading segments for a fixed amount of time, as opposed to shifting the media playback to a higher streaming quality as soon as allowed by the bandwidth and data throughput of the client.

For example, assume Client Device A is programmed to download five segments of 8 second segment durations before switching to another streaming quality, and assume that the available bandwidth and data throughput of the Client Device A supports a high streaming quality at all points of media playback. If Client Device A begins streaming at a medium streaming quality, and desires a transition to a high streaming quality, then Client Device A will have to stream 40 seconds at the medium streaming quality before making the transition to the high streaming quality. Streaming at a medium streaming quality for 40 seconds is not optimized media playback because the Client Device A could have streamed in the high streaming quality for the 40 seconds.

Resolution of the aforementioned issues, as well as further optimization of media playback, may be accomplished using segment fluidity, which is a technique of grouping segments during media creation or media processing such that segments of optimal duration for each particular client device's platform may be presented to the respective client devices as necessary.

In the embodiments herein, a packager generates client-specific playlists that reference one or more URIs that have segment durations optimized for particular types of client devices. When a client device receives a playlist from a server, the server can identify the type of client device making the request, and deliver a playlist optimized for the particular client device to the client device. The client device uses the optimized, client-specific playlist to fetch or request a variable grouping of segments from the server. The variable grouping of segments allows for real time optimization of segment length for improved media playback performance. In this manner, segment fluidity improves media playback performance on client devices implementing differing operating systems and media players.

In one embodiment, the variable grouping of segments is used to provide shorter segment durations at media playback startup and seek points, while providing longer segment durations during parts of the media playback where an end user is unlikely to initiate a start or seek operation.

FIG. 1 illustrates a system for delivering client-specific playlists and processed variant streams to client devices, according to one embodiment. In this embodiment, audio-visual (AV) inputs 110 generate a multimedia stream that is delivered to a transcoder 130. The transcoder 130 converts the multimedia stream into one or more encoded variant streams, each of which contains the same media content, but at a different bitrate. The encoded variant streams include demarcations at segment boundaries that are aligned across the encoded variant streams. The encoded variant streams are delivered to a packager 140.

The packager 140 includes a data unit 142, a playlist unit 144, and a delivery unit 146. In one embodiment, the data unit 142, the playlist unit 144, and the delivery unit 146 are software modules executed in hardware (e.g., a processor and memory). The data unit 142 includes data about maximum segment durations that provides optimal media playback performance for various client device operating systems 158a and media players 158b. The maximum segment durations are optimized per client device. For example, a first type of client device may have optimal media playback using shorter maximum segment durations, as compared to a second type of client device with optimal feedback using longer maximum segment durations.

The playlist unit 144 identifies the maximum segment duration of each client device's operating system 158a or media player 158b, and creates a respective media playlist (a client-specific playlist) for each of those client device operating systems 158a or media players 158b. The encoded variant streams are processed such that the maximum segment durations, or a grouping of maximum segment durations, are accessible using byte-ranges. The client-specific playlists are then generated for each processed variant stream 148.

The delivery unit 146 delivers the client-specific playlists to a distribution network 150. There, in one embodiment, the client-specific playlists and processed variant streams 148 are first sent to one or more servers 152. The client-specific playlists are then sent to the client devices 156. The one or more servers service any fetches/requests from the client devices for segments of media content. That is, using the client-specific playlists, the client devices 156 can submit requests to the distribution network 150 for the segments identified in those playlists in order to play the media content.

Alternatively, the client-specific playlists and processed variant streams 148 are first sent to one or more servers 152. The client-specific playlists are then sent to a content delivery network (CDN) 154, which delivers the client-specific playlists to the client devices 156 and services client devices' fetches/requests for segments of the media content. In yet another example, the client-specific playlists and processed variant streams 148 are first sent to a CDN 154, which delivers the client-specific playlists to the client devices 156 and services client devices' fetches/requests for segments of the media content. Use of a CDN to service fetched/requested segments can improve media playback by reducing the delivery time of the fetched/requested segments due to the localization of CDN edge servers.

Figure 2:
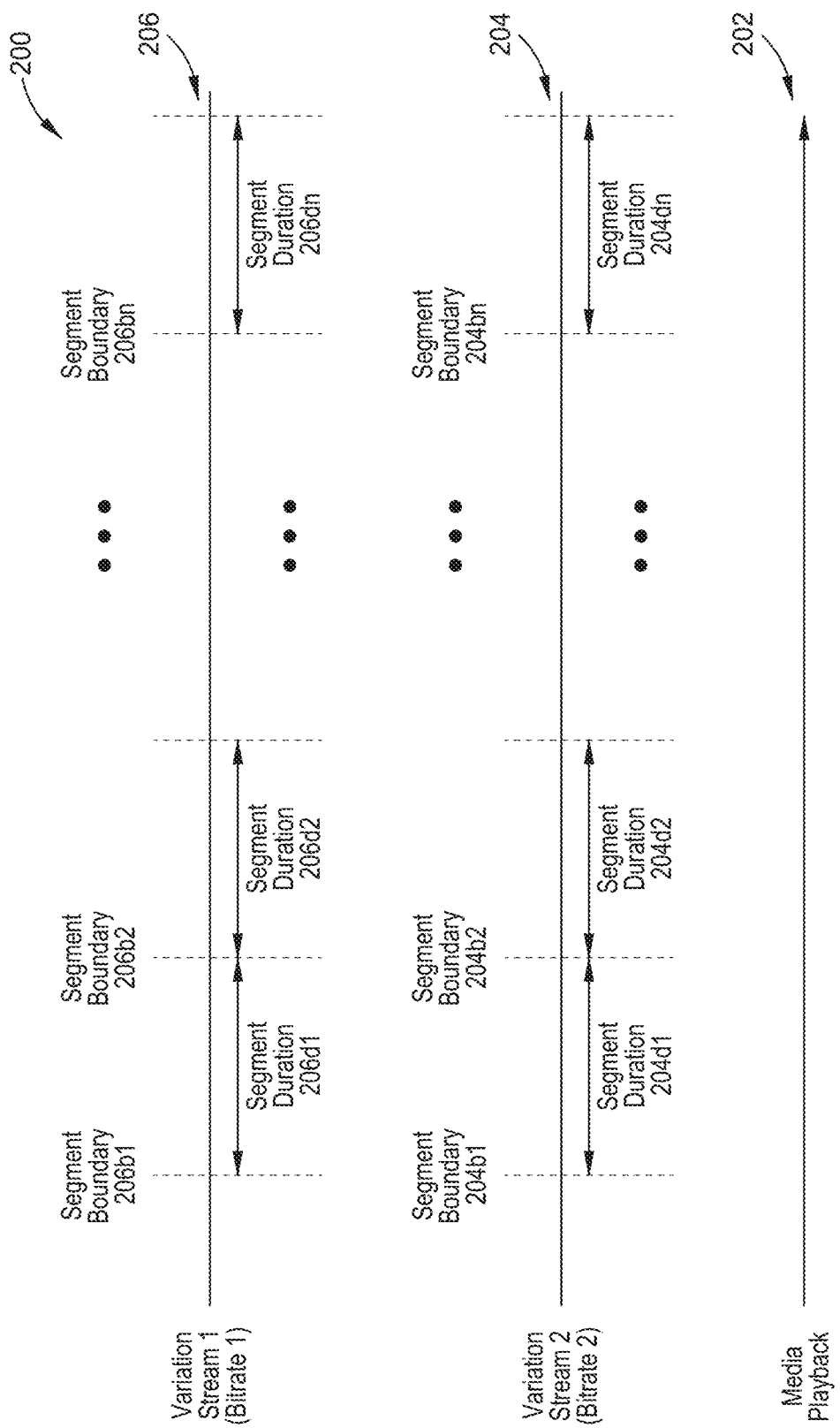
FIG. 2 illustrates encoded variant streams for common media content, according to one embodiment.

FIG. 2 illustrates encoded variant streams for common (i.e., the same) media content, according to one embodiment. In this embodiment, Variant Stream 1 206 and Variant Stream 2 204 are encoded variant streams of different streaming qualities (bitrate 1 and bitrate 2). Each variant stream includes demarcations of potential segments that may exist after the encoded variant stream is processed. Each potential segment is designated by equal segment durations (e.g., 204d1-204dn) or by adjacent segment boundaries (e.g., 204b1 and 204b2).

The segment boundaries are aligned across the variant streams. In this example, ABR variant switching occurs at the segment boundaries 204b1-n and 206b1-n. At each segment boundary, a different variant stream may be delivered to the client device based on the network bandwidth and data throughput of the client device. That is, a client device implementing ABR can decide, at a segment boundary, to switch to a lower or higher bitrate variant stream based on the present network bandwidth and data throughput of the client device.

For example, if Bitrate 1 is 5 Mbps and Bitrate 2 is 2 Mbps, then media playback 202 may begin by streaming at the lower streaming quality Variant Stream 2 204. If the available network bandwidth and data throughput of the client device allow for playback of the higher streaming quality Variant Stream 1 206, then the client device retrieves the playlist for the Variant Stream 1 and submits requests for the segments of Variant Stream 1 206. The switch from Variant Stream 2 204 to Variant Stream 1 206 can occur at any of the segment boundaries (e.g., 204b1 and 206b1) aligned across Variant Stream 1 206 and Variant Stream 2 204.

Subsequently, if the available network bandwidth and data throughput of the client device can no longer sustain the higher streaming quality Variant Stream 1 206, then the client can request segments of lower streaming quality Variant Stream 2 204 from the server or CDN servicing the request. The switch from Variant Stream 1 206 to Variant Stream 2 204 occurs at later segment boundaries (e.g., 204bn and 206bn) aligned across Variant Stream 1 206 and Variant Stream 2 204.

A chapter is a point of transition in the media content. For example, a chapter may indicate the beginning or end of an advertisement break, or a natural break in a conversation between characters in the media content. In one embodiment, chapters operate as segment boundaries. A chapter may occur at any appropriate location in the media playback 202, irrespective of the chapter's position relative to a non-chapter segment boundary.

Figure 3:
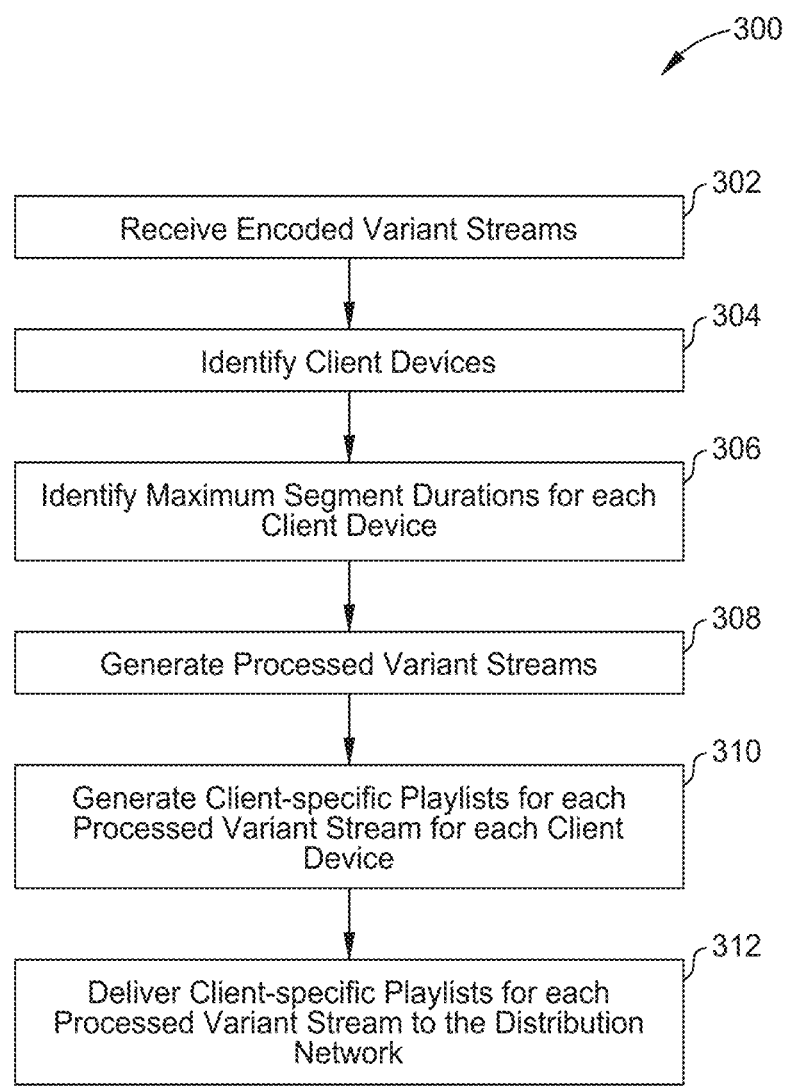
FIG. 3 illustrates a flowchart for operating a packager, according to one embodiment.

FIG. 3 illustrates a flowchart for the operation of a packager, according to one embodiment. Because different client devices have differing optimal maximum segment durations for optimal media playback, FIG. 3 provides techniques for delivering client-optimized segment durations to each client device. Further, because an optimal segment duration may change during media playback, FIG. 3 enables optimization techniques for changing the span of a segment duration in real time. The packager operates to resolve the aforementioned issues. Although, FIG. 3 is explained with references to other figures of the present application, such references are made for clarity and should not be construed to limit interpretation of FIG. 3 to the embodiments of the aforementioned figures.

At block 302, the packager receives encoded variant streams from a transcoder. Each encoded variant stream includes demarcations for potential segments of media content. Each encoded variant stream contains the same media content, but has a different streaming quality/bitrate. The beginning and end of each potential segment of media content is a segment boundary (e.g., 204b1 and 204b2 in FIG. 2), which is aligned across all the encoded variant streams. Two adjacent segment boundaries (e.g., 204b1 and 204b2) designate a segment duration (e.g., 204dn).

At block 304, the playlist unit 144 identifies client devices for the delivery of client-specific playlists and processed variant streams. In one embodiment, the data unit 142, the playlist unit 144, and the delivery unit 146 are software modules executed in hardware (e.g., a processor and memory). The playlist unit 144 may gather data regarding characteristics of the client from the data unit 142, which is populated with predetermined data about each client device. The predetermined data may be determined by testing media players and clients for optimal performance. For example, field testing may show that for a first type of client device, using a playlist with a maximum segment duration of 4 seconds results in faster video startup times, faster variant switching, or decreased server load, whereas for a second type of client device, using a playlist with a maximum segment duration of 8 seconds results in faster video startup times, faster variant switching, or decreased server load. Hence, in this example, the maximum segment duration of 4 seconds is the predetermined data that is a characteristic of the first client, while the maximum segment duration of 8 seconds is the predetermined data that is a characteristic of the second client.

At block 306, the playlist unit 144 identifies the maximum segment durations in the encoded variant streams for optimal playback of each client device. The playlist unit 144 may gather data regarding the maximum segment durations for each client device from the data unit 142, which includes data about maximum segment durations that provides optimal media playback performance for various client device operating systems 158a and media players 158b.

The maximum segment durations are optimized per client device. For example, a first client device may use OS B, while a second client device uses OS A; or, the first client device may use Media Player A while the second client device uses media player B. The first client may have an optimal maximum segment duration of 8 seconds, while the second client device has an optimal maximum segment duration of 4 seconds. A playlist that delivers segments with maximum segment durations optimized for the first client would negatively impact the playback experience of the second client device, for at least the reason that the longer maximum segment duration would give the second client device fewer opportunities to switch across variant streams when implementing ABR.

The aforementioned issue is resolved by providing client-specific playlists to each client device. Therefore, the first client device has optimal performance when it receives client-specific playlists that all have a maximum segment duration of 8 seconds. Similarly, the second client device has optimal performance when it receives client-specific playlists all of which have a maximum segment duration of 4 seconds.

At block 308, the packager generates processed variant streams by segmenting the encoded variant streams at the demarcations included in the encoded variant streams. The segmenting of the encoded variant streams may include segmenting each encoded variant stream into multiple segment files that collectively comprise the corresponding processed variant stream. Alternatively, the segmenting of the encoded variant streams may include preparing each corresponding processed variant stream for single-file byte-range access to each maximum duration segment, or a grouping thereof.

Because each encoded variant stream includes demarcations for potential segments of media content, each processed variant stream includes (realized) segments of media content. The beginning and end of each segment in the processed variant stream is a segment boundary, which is aligned across the processed variant streams per client device. The difference between the timestamps of two adjacent segment boundaries indicates a segment duration.

At block 310, the packager generates client-specific playlists for each processed variant stream for each client device. When the packager segments the encoded variant streams, the playlist unit 144 generates client-specific playlists for each client device. This is illustrated in FIG. 4.

Figure 4:
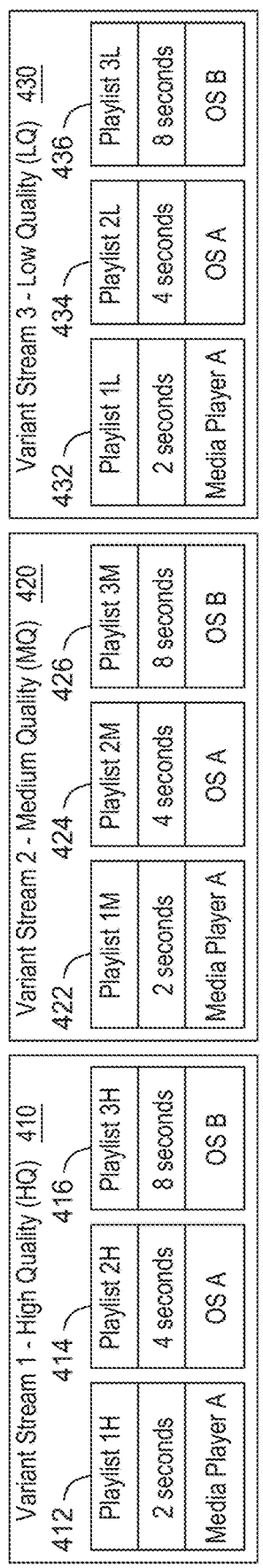
FIG. 4 illustrates processed variant streams with corresponding client-specific playlists, according to one embodiment.

FIG. 4 illustrates variant streams with corresponding client-specific playlists according to one embodiment. In this embodiment, the three variant streams correspond to the same media content, and each variant stream includes three client-specific playlists. In this example, the client-specific playlists are for client devices that have three different operating systems or media players. As mentioned above, the embodiments herein are not limited to generating specific playlists for clients that have different operating systems or media players. The packager can generate client-specific playlists for client devices that have other types of software or hardware modules.

As shown, Playlists 1H, 1M, and 1L are playlists for the same type of client device—i.e., a client device that uses Media Player A. Playlist 1H 412 is a client-specific playlist for the high quality Variant Stream 1 410. Playlist 1M 422 is a client-specific playlist for the medium quality Variant Stream 2 420. Playlist 1L 432 is a client-specific playlist for the low quality Variant Stream 3 430. The Media Player A in this embodiment has optimal media playback performance with 2 second segment durations. Therefore, the maximum segment duration in Playlists 1H, 1M, and 1L spans 2 seconds.

Playlists 2H, 2M, and 2L are optimized for a client device implementing OS A. Playlist 2H 414 is a client-specific playlist for the high quality Variant Stream 1 410. Playlist 2M 424 is a client-specific playlist for the medium quality Variant Stream 2 420. Playlist 2L 434 is a client-specific playlist for the low quality Variant Stream 3 430. In this embodiment, OS A has optimal media playback performance with 4 second segment durations. Therefore, the maximum segment duration in Playlists 2H, 2M, and 2L spans 4 seconds.

Playlists 3H, 3M, and 3L are made available to a client implementing OS B. Playlist 3H 416 is a client-specific playlist for the high quality Variant Stream 1 410. Playlist 3M 426 is a client-specific playlist for the medium quality Variant Stream 2 420. Playlist 3L 436 is a client-specific playlist for the low quality Variant Stream 3 430. In this embodiment, OS B has optimal media playback performance with 8 second segment durations. Therefore, the maximum segment duration in Playlists 3H, 3M, and 3L spans 8 seconds.

ABR is implemented by delivering appropriate segments from the high, medium, or low quality variant streams of the client-specific playlists for the same client device. For example, if playback is presently using segments from Playlist 3M 426, then the client downloads segments for OS A from the medium quality Variant Stream 2 420.

If available network bandwidth and data throughput allows switching to the higher quality Variant Stream 1 410, then segments from Playlist 3H 416, for which OS A is the client device, is delivered to the client device. Alternatively, if available network bandwidth and data throughput cannot sustain uninterrupted playback of the medium quality Variant Stream 2 420, then segments from Playlist 3L 436, for which OS A is the client device, is delivered to the client device. In this manner, the client device can request client-specific playlists that have the optimized segment duration.

In one embodiment, the client-specific playlists are UTF-8 text files containing a list of one or more URIs and descriptive tags. The URIs identify the segments of media content in the processed variant streams. The descriptive tags specify information and parameters of the client-specific playlists.

In one embodiment, each URI in the list is immediately preceded by an EXTINF tag, which indicates a segment duration of the segment corresponding to the URI. A segment grouping may be designated by EXT-X-BYTERANGE tags, which indicate a range of the URI resource corresponding to the segment grouping. The client-specific playlist includes an EXT-X-ENDLIST tag, which indicates that there are no more segments in the client-specific playlist.

In one embodiment, the client-specific playlists include byte-ranges that designate an optimized maximum segment duration for the respective client device. For example, if a client device uses OS A, it may have an optimal maximum segment duration of 4 seconds. This client device receives Playlist 2H 414 representing the high streaming quality processed Variant Stream 1 410, Playlist 2M 424 representing the medium streaming quality Variant Stream 2 420, and Playlist 2L 434 representing the low streaming quality Variant Stream 3 430.

Because the client-specific playlists have segments and segment boundaries aligned across the processed variant streams, the client device can switch between streaming qualities by requesting a grouping of segments from one of the client-specific playlists not presently being used by the client device. The server that services the request will then deliver sequential segments from the client-specific playlist corresponding to the desired streaming quality to the client device at the next segment boundary.

Returning to FIG. 3, at block 312, the packager delivers the client-specific playlists to the client via a distribution network. In one embodiment, the delivery unit 146 delivers the client-specific playlists to a distribution network 150. In the distribution network 150, the client-specific playlists and processed variant streams 148 are first sent to one or more servers 152. When a client device requests media content, a server may determine the type of client device based on user agent data included in the headers of the media content request. The one or more servers then deliver the appropriate client-specific playlists to the client device 156, and service any fetches/requests from the client device for segments of media content.

In another embodiment, the delivery unit 146 delivers one or more master playlists to a distribution network 150. In the distribution network 150, the master playlists are first sent to one or more servers 152. The one or more servers 152 may include multiple master playlists from multiple sources. Each master playlist includes variant streams with equal segment durations for all the variant streams in that respective master playlist. However, the segment durations for the variant streams differ between each master playlist. For example, master playlist A may include variant streams A1, A2, and A3, each with segment durations of 4 seconds, while master playlist B may include variant streams B1, B2, and B3, each with segment durations of 8 seconds. When a client device requests media content, a server delivers a master playlist containing optimal segment durations for the client device to the client device. The server then services any fetches/requests from the client device for segments of media content.

In another embodiment, the client-specific playlists and processed variant streams 148 are first sent to one or more servers 152. The client-specific playlists are then sent to a content delivery network (CDN) 154. When a client device requests media content, the CDN may determine the type of client device based on user agent data included in the headers of the media content request. The CDN then delivers the appropriate client-specific playlists to the client device 156, and services the client device's fetches/requests for segments of media content.

In yet another embodiment, the client-specific playlists and processed variant streams 148 are first sent to a CDN 154. When a client device requests media content, the CDN determines the type of client device based on user agent data included in the headers of the media content request. The CDN then delivers the appropriate client-specific playlists to the client device 156, and services client device's fetches/requests for segments of media content. Use of a CDN to service fetched/requested segments can improve media playback by reducing the delivery time of the fetched/requested segments due to the localization of CDN edge servers. This embodiment differs from the previous embodiment in that this embodiment only uses a CDN to distribute playlists to the client devices, whereas the previous embodiment can use a combination of servers and CDNs to distribute playlists to the client devices.

Figure 5:
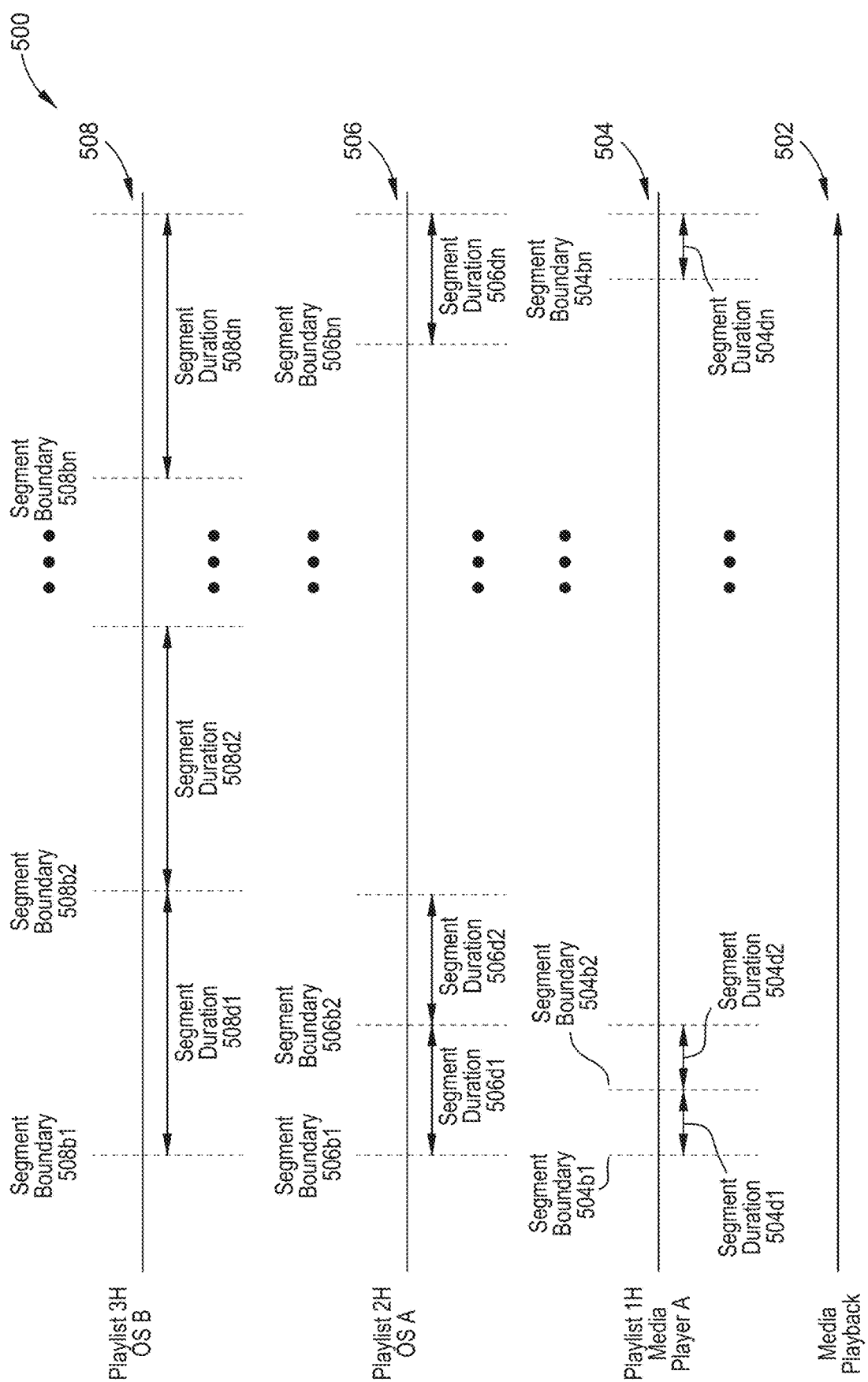
FIG. 5 illustrates segment durations and segment boundaries of different client-specific playlists for the same variant stream, according to one embodiment.

FIG. 5 illustrates segment durations and segment boundaries of different client-specific playlists for a single variant stream (e.g., Variant Stream 1 in FIG. 4). In one embodiment, a high quality variant stream includes three client-specific playlists 504, 506, and 508. Three client device operating systems and media players are represented in the client-specific playlists: OS A, OS B, and Media Player A.

Playlist 1H includes segments optimized for a Media Player A. Two adjacent segment boundaries (e.g., 504$b1$ and 504$b2$) designate a segment duration (e.g. 504$d1$). ABR may operate to switch the streaming quality at a segment boundary (e.g., 504$b2$).

Playlist 2H includes segments optimized for OS A. Two adjacent segment boundaries (e.g., 506$b1$ and 506$b2$) designate a segment duration (e.g. 506*d*1). ABR may operate to switch the streaming quality at a segment boundary (e.g., 506*b*2).

Playlist 3H includes segments optimized for OS B. Two adjacent segment boundaries (e.g., 508*b*1 and 508*b*2) designate a segment duration (e.g. 508*d*1). ABR may operate to switch the streaming quality at a segment boundary (e.g., 508*b*2).

The segment durations of Playlists 1H, 2H, and 3H may differ from one another. For example, Playlist 3H may have a segment duration of 8 seconds, Playlist 2H may have a segment duration of 4 seconds, and Playlist 1H may have a segment duration of 2 seconds. Hence, in one embodiment, Playlists 1H, 2H, and 3H reference, in the same variant stream, segments having segment durations that differ between the respective playlists.

The maximum segment durations optimized per client device improve media playback as compared to, for example, receiving a fixed-duration segment duration for all client devices. For example, a first client device running OS B has an optimal maximum segment duration of 8 seconds, while a second client device running OS A has an optimal maximum segment duration of 4 seconds. A playlist that delivers segments with maximum segment durations optimized for the first client would negatively impact the playback experience of the second client device, for at least the reason that the longer maximum segment duration would give the second client device fewer opportunities to switch across variant streams when implementing ABR. In addition, having maximum segment durations that are too small unnecessarily increases the number of segment fetches/requests executed by the client device, thereby wasting processing power from the client device and increasing the load on the server that is servicing the fetches/requests.

Further, if a client device media player is programmed to download a fixed number of segments before implementing ABR, then maximum segment durations that are longer than the client device's optimized maximum segment duration may prolong the time spent at an undesired streaming quality, since more time would be required to download the segments with the longer maximum segment duration. For example, if segments with 8 second segment durations are delivered to a client device that is optimized for 2 second segment durations, and the client device's media player is programmed to download 2 segments before being allowed to switch to a different streaming quality, then the segments with 8 second segment durations would force a wait time of 16 seconds before the media player could implement ABR, as compared to a wait time of 4 seconds for the segments with 2 second segment durations. Therefore, if the media player wanted to switch to a superior streaming quality after a start or seek point, the media player would deliver 12 seconds more of inferior streaming quality to the end user before switching to the better quality stream when using segments with 8 second segment durations, as compared to when the media player is using 2 second segment durations.

Further, if a client device media player is programmed to download segments for a fixed amount of time before implementing ABR, then maximum segment durations that are longer than the client device's optimized maximum segment duration would prolong the time spent at an undesired streaming quality, since the media player would necessarily overshoot the time needed before implementing ABR.

For example, if segments with 8 second segment durations are delivered to a client device that is optimized for 2 second segment durations, and the client device's media player is programmed to download segments for 10 seconds before being allowed to switch to a different streaming quality, then the 8 second segments would overshoot the required download time by 6 seconds, since two 8 second segments would be downloaded, as ABR cannot be implemented during a segment, and the required 10 seconds of segment downloads is not met by downloading one 8 second segment. Therefore, if the media player wanted to switch to a superior streaming quality after a start or seek point, the media player would deliver 6 seconds more of inferior streaming quality to the end user before switching to the better quality stream when using segments with 8 second segment durations, as compared to when the media player when using 2 second segment durations.

Figure 6:
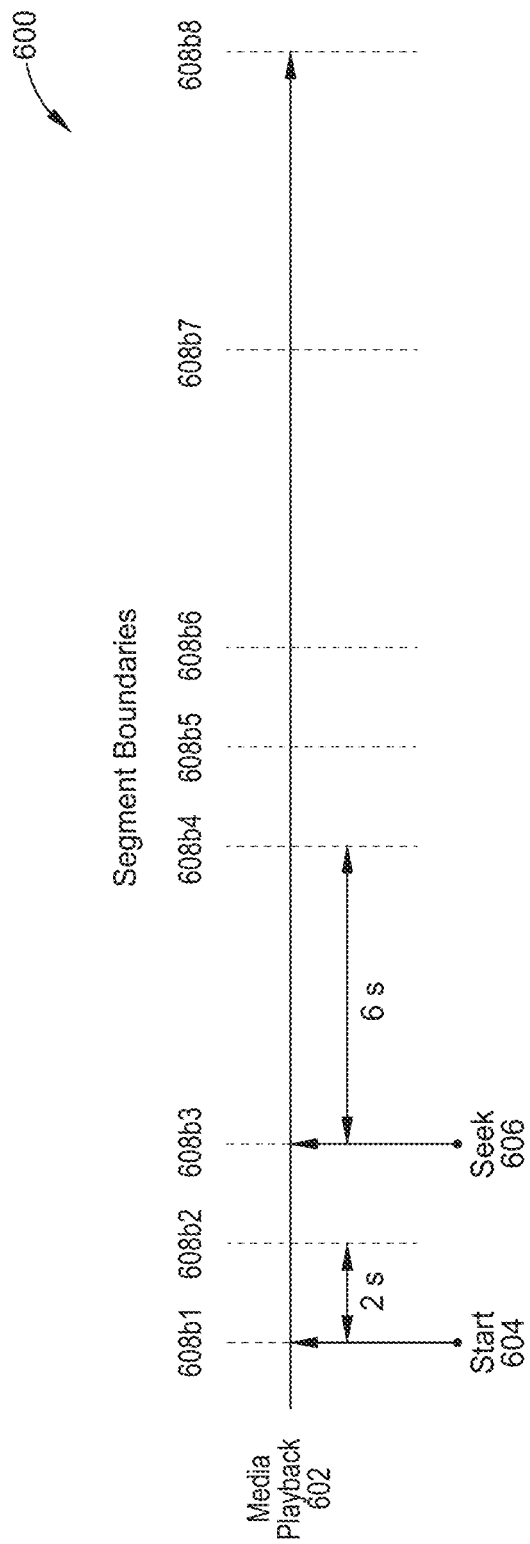
FIG. 6 illustrates changing segment duration groupings at various points of media playback, according to one embodiment.

FIG. 6 illustrates changing segment duration groupings at various points of media playback, according to one embodiment. Variable segment duration groupings make use of segment fluidity to combine shorter duration segments into longer duration segments in real time. Specifically, a variable segment duration grouping is an optimization enabled by using client-specific playlists that include byte-ranges to identify segments in the processed variant streams.

For instance, playlist 1H 412 from FIG. 4 illustrates a client device with a maximum segment duration of 2 seconds. However, all of the segments designated in playlist 1H 412 are static. Media playback using playlist 1H will stream a series of 2 second segments. The variable segment duration groupings, on the other hand, allows for building larger segments based on the maximum duration segments for optimization during changing playback conditions.

In one embodiment, segment durations are changed by grouping one or more maximum segment durations. Adjacent segment boundaries (e.g., 608*b*1 and 608*b*2) define a segment and segment duration. ABR may operate to switch the streaming quality at a segment boundary (e.g., 608*b*3). Each segment is identifiable using byte-ranges in a client-specific playlist. Multiple segments may be grouped together using byte-ranges.

In this example, the client device reaches optimal media playback performance with a maximum segment duration spanning 2 seconds. The client device begins media playback 602 in a medium streaming quality. The starting point of the media playback, Start 604, occurs at a segment boundary 608*b*1.

At Start 604, the client device downloads multiple segments of 2 second durations, which provide multiple opportunities—i.e., multiple segment boundaries 608*b*2, 608*b*3—to switch to a different streaming quality. Having multiple opportunities to switch between streaming qualities at the Start 604 reduces the time needed to achieve optimal playback performance, since the streaming quality may be switched at an earlier segment boundary 608*b*2. Similarly, the time needed to achieve optimal playback performance may be reduced for client device media players that require a fixed amount of segments to be downloaded before switching to a different streaming quality, since the condition for switching can be satisfied at an early time during the media playback 602.

After downloading the initial set of multiple segments, the client device uses byte-ranges to request a grouping of three consecutive segments. The grouping comprises a combined 6 second segment designated by adjacent segment boundaries 608*b*3 and 608*b*4. Allowing dynamic grouping of segments balances the aforementioned optimization of media playback performance with reducing the load on the server delivering the segments, since longer segments are easier for a server to process than multiple shorter segment counterparts.

A seek point is a specific position in the media playback 602 that is selected by the end-user of the media player. The Seek 606 begins at a segment boundary 608b4. At the Seek 606, the client device downloads multiple segments of 2 second durations. Unless the client device has access to a cache containing segments necessary for immediate media playback, a seek will operate like a starting point. Hence, the seek will download an initial set of smaller multiple segments and then dynamically group the smaller segments into larger segments.

Figure 7:
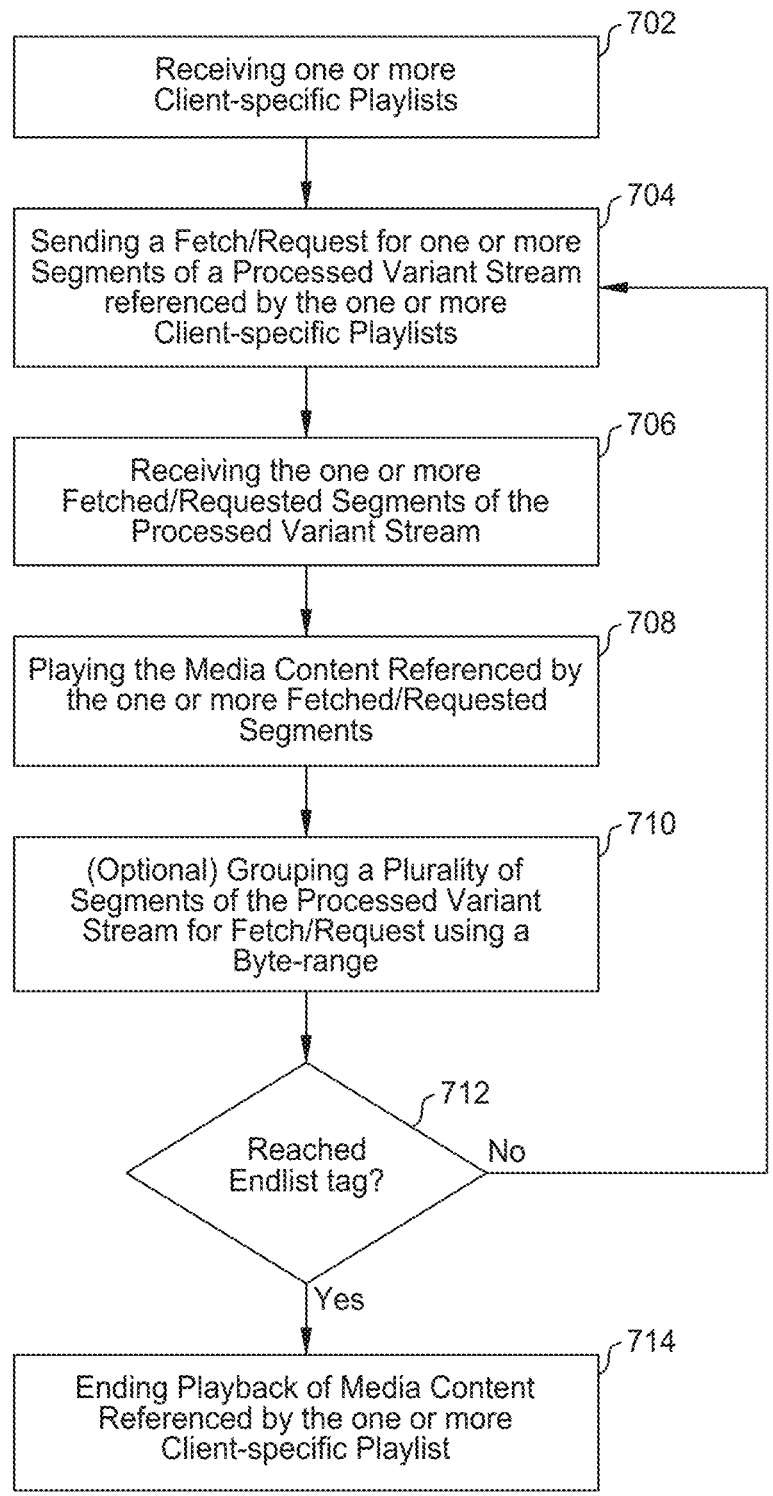
FIG. 7 illustrates media playback on a client device, according to one embodiment.

FIG. 7 illustrates media playback on a client device, according to one embodiment. In this embodiment, a client device requests multiple segments via a client-specific playlist to output media content to an end user. The client device is enabled to group segments dynamically for optimization of media playback.

At block 702, the client device receives one or more client-specific playlists. Each client-specific playlist references one or more segments using byte-range tags. Each client-specific playlist corresponds to a different processed variant stream, which represents the same media content at different bitrates. Each client-specific playlist includes an Endlist tag, which marks the end of the one or more client-specific playlists.

In one embodiment, to receive the client-specific playlist, the client device sends identifying information to the packager, which uses the information to determine the type of the client device, and thus, the optimal playlist for the client device. The packager then sends the client device (or more specifically, the media player on the client device) the optimal playlist. Once the playlist is identified, the client device can request the playlist from the distribution network and then begin to download segments of the media content using the playlist as described below.

In another embodiment, the client device identifies itself to a CDN (rather than the packager) containing playlists and variant streams. The CDN identifies a playlist with a maximum segment duration that is optimal for media playback on the client device, the client device requests the identified playlist, and the CDN delivers this playlist to the client device.

At block 704, the client device sends a fetch/request for a segment of the processed variant stream referenced by the one or more client-specific playlists. The first time a client device requests a segment of media content after a start or seek point, the fetch/request will be for a segment having the maximum segment duration specified in the client-specific playlist.

The client device can implement ABR by targeting segments referenced in a different client-specific playlist (i.e., one of the received client-specific playlists that represent a different variant stream) to change streaming qualities. The client device makes the decision to fetch/request the segment from a different client-specific playlist based on the available network bandwidth and present data throughput of the client device.

At block 706, the client device receives the fetched/ requested segments of the processed variant stream. At block 708, the client device plays the media content referenced by the fetched/requested segment.

At block 710, the client device may use byte-ranges to group a plurality of segments into a single segment grouping to be fetched/requested from the one or more processed variant streams. A client device may group together multiple, sequential segments of the maximum segment duration specified in the client-specific playlists using byte-ranges. Grouping multiple segments into a single segment may optimize media playback by decreasing the amount of processing power used by the client device when compared to requesting, receiving, and processing multiple segments. Further, grouping multiple segments into a single segment reduces the load on a server that is servicing the client device's fetches/requests for media content, for similar reasons.

At block 712, if the last segment has been reached, playback of the media content referenced by the one or more client-specific playlists is terminated, as per block 714. If the Endlist tag has not been reached, the client device continues the streaming operation as per block 704.

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method, comprising:
receiving a first variant stream of a video at an electronic system;
identifying, by the electronic system, respective maximum segment durations for a plurality of different types of client devices;
generating, by the electronic system and based on the identified respective maximum segment durations and the first variant stream, a plurality of playlists for the plurality of different types of client devices, wherein the plurality of playlists comprise a plurality of different maximum segment durations;
delivering, by the electronic system and via a distribution network, a first playlist of the respective playlists to a first client device having a device type corresponding to one of the plurality of different types of client devices, the first playlist comprising a first maximum segment duration of the respective maximum segment durations;
generating, based on a second variant stream corresponding to the same media content as the first variant stream but having a different streaming bitrate, a second playlist for the first client device,
wherein the first playlist and the second playlist each comprise a plurality of segments and the first playlist and the second playlist each comprise the first maximum segment duration as their respective maximum segment duration,
wherein each segment in the first playlist has: (i) a same media content, (ii) a same media duration, and (iii) a different streaming bitrate, compared with a corresponding segment in the second playlist, and
wherein segment boundaries of the plurality of segments of the second playlist are aligned with the segment boundaries of the plurality of segments of the first playlist; and
delivering, by the electronic system and via the distribution network, to the first client device, segments of the second playlist, in place of segments of the first playlist to continue playout of the same media content, wherein the delivered segments of the second playlist comprise the same first maximum segment duration as the delivered segments of the first playlist.

2. The method of claim 1, further comprising:
delivering to the first client device, via the distribution network, a variable grouping of segments providing a first grouped segment duration that is shorter in length than a second grouped segment duration,
wherein the first, shorter, grouped segment duration is used for at least one of: (i) a media playback startup point or (ii) a media playback seek point, while the second, longer, grouped segment duration is used during other parts of the media playback.

3. The method of claim 2, wherein the first, shorter, grouped segment duration is used for the media playback startup point.

4. The method of claim 1, wherein identifying the maximum segment duration for each of the plurality of different types of client devices is based on at least one of an operating system and a media player of the plurality of client devices.

5. The method of claim 1, wherein each of the respective playlists references a single Uniform Resource Indicator.

6. The method of claim 1, further comprising:
inserting byte-range tags into the respective playlists to demarcate each segment boundary and chapter in the first variant stream.

7. The method of claim 1, further comprising:
receiving a request for a grouped segment from one of the plurality of different types of client devices, wherein the grouped segment is identified by a byte-range that includes multiple segments of the maximum segment duration.

8. A non-transitory computer-readable medium containing computer program code that, when executed by operation of one or more computer processors, performs an operation comprising:
receiving a first variant stream of a video at an electronic system;
identifying, by the electronic system, respective maximum segment durations for a plurality of different types of client devices;
generating, by the electronic system and based on the identified respective maximum segment durations and the first variant stream, a plurality of playlists for the plurality of different types of client devices, wherein the plurality of playlists comprise a plurality of different maximum segment durations;
delivering, by the electronic system and via a distribution network, a first playlist of the respective playlists to a first client device having a device type corresponding to one of the plurality of different types of client devices, the first playlist comprising a first maximum segment duration of the respective maximum segment durations;
generating, based on a second variant stream corresponding to the same media content as the first variant stream but having a different streaming bitrate, a second playlist for the first client device,
wherein the first playlist and the second playlist each comprise a plurality of segments and the first playlist and the second playlist each comprise the first maximum segment duration as their respective maximum segment duration,
wherein each segment in the first playlist has: (i) a same media content, (ii) a same media duration, and (iii) a different streaming bitrate, compared with a corresponding segment in the second playlist, and
wherein segment boundaries of the plurality of segments of the second playlist are aligned with the segment boundaries of the plurality of segments of the first playlist; and
delivering, by the electronic system and via the distribution network, to the first client device, segments of the second playlist, in place of segments of the first playlist to continue playout of the same media content, wherein the delivered segments of the second playlist comprise the same first maximum segment duration as the delivered segments of the first playlist.

9. The non-transitory computer-readable medium of claim 8, the operation further comprising:
delivering to the first client device, via the distribution network, a variable grouping of segments providing a first grouped segment duration that is shorter in length than a second grouped segment duration,
wherein the first, shorter, grouped segment duration is used for at least one of: (i) a media playback startup point or (ii) a media playback seek point, while the second, longer, grouped segment duration is used during other parts of the media playback.

10. The non-transitory computer-readable medium of claim 9, wherein the first, shorter, grouped segment duration is used for the media playback startup point.

11. The non-transitory computer-readable medium of claim 8, the computer-readable program code further configured to:
identify the maximum segment duration for each of the plurality of different types of client devices is based on at least one of an operating system and a media player of the plurality of client devices.

12. The non-transitory computer-readable medium of claim 8, wherein each of the respective playlists reference a single Uniform Resource Indicator.

13. The non-transitory computer-readable medium of claim 8, the computer-readable program code further configured to:
insert byte-range tags into the respective playlists to demarcate each segment boundary and chapter in each of the first variant stream.

14. The non-transitory computer-readable medium of claim 8, the computer-readable program code further configured to:
receive a request for a grouped segment from one of the plurality of different types of client devices, wherein the grouped segment is identified by a byte-range that includes multiple segments of the maximum segment duration.

15. A system, comprising:
a computer processor; and
a memory having instructions stored thereon which, when executed on the computer processor, performs operations comprising:
receiving a first variant stream of a video at an electronic system;
identifying, by the electronic system, respective maximum segment durations for a plurality of different types of client devices;
generating, by the electronic system and based on the identified respective maximum segment durations and the first variant stream, a plurality of playlists for the plurality of different types of client devices, wherein the plurality of playlists comprise a plurality of different maximum segment durations;
delivering, by the electronic system and via a distribution network, a first playlist of the respective playlists to a first client device having a device type corresponding to one of the plurality of different types of client devices, the first playlist comprising a first maximum segment duration of the respective maximum segment durations;
generating, based on a second variant stream corresponding to the same media content as the first variant stream but having a different streaming bitrate, a second playlist for the first client device,
wherein the first playlist and the second playlist each comprise a plurality of segments and the first playlist and the second playlist each comprise the first maximum segment duration as their respective maximum segment duration,
wherein each segment in the first playlist has: (i) a same media content, (ii) a same media duration, and (iii) a different streaming bitrate, compared with a corresponding segment in the second playlist, and wherein segment boundaries of the plurality of segments of the second playlist are aligned with the segment boundaries of the plurality of segments of the first playlist; and delivering, by the electronic system and via the distribution network, to the first client device, segments of the second playlist, in place of segments of the first playlist to continue playout of the same media content, wherein the delivered segments of the second playlist comprise the same first maximum segment duration as the delivered segments of the first playlist.

16. The system of claim 15, the operation further comprising:

delivering to the first client device, via the distribution network, a variable grouping of segments providing a first grouped segment duration that is shorter in length than a second grouped segment duration, wherein the first, shorter, grouped segment duration is used for at least one of: (i) a media playback startup point or (ii) a media playback seek point, while the second, longer, grouped segment duration is used during other parts of the media playback.

17. The system of claim 15, wherein identifying the maximum segment duration for each of the plurality of different types of client devices is based on at least one of an operating system and a media player of the plurality of client devices.

18. The system of claim 15, wherein each of the respective playlists reference a single Uniform Resource Indicator.

19. The system of claim 15, the operations further comprising:

inserting byte-range tags into the respective playlists to demarcate each segment boundary and chapter in the first variant stream.

20. The system of claim 15, the operations further comprising:

receiving a request for a grouped segment from one of the plurality of different types of client devices, wherein the grouped segment is identified by a byte-range that includes multiple segments of the maximum segment duration.

* * * * *